United States Patent
Yamamoto et al.

(10) Patent No.: US 6,631,376 B1
(45) Date of Patent: Oct. 7, 2003

(54) EXCHANGE SERVICING DEVELOPMENT SUPPORT SYSTEM WITH A FUNCTION OF AUTOMATIC REPLACEMENT OF EDITED CONTENTS

(75) Inventors: Hirohisa Yamamoto, Tokyo (JP); Takashi Shinoda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/471,197

(22) Filed: Dec. 23, 1999

(30) Foreign Application Priority Data

Dec. 25, 1998 (JP) .......................................... 10-370468

(51) Int. Cl.[7] .............................................. G06F 17/30
(52) U.S. Cl. .............................. 707/10; 707/3; 707/104; 717/137
(58) Field of Search .............................. 704/9; 717/137, 717/143; 345/760; 707/1, 2, 103, 3, 205, 104, 100, 101, 102, 531, 505, 7, 10, 200; 706/51; 709/221; 716/13

(56) References Cited

U.S. PATENT DOCUMENTS 5,757,656 A * 5/1998 Hershberger et al. ......... 716/13
5,848,426 A * 12/1998 Wang et al. ................. 707/505
5,953,723 A * 9/1999 Linoff et al. ................. 707/102
5,978,789 A * 11/1999 Griffin et al. ................... 707/2
6,041,303 A * 3/2000 Mathews ........................ 705/1
6,108,637 A * 8/2000 Blumenau ....................... 705/7
6,115,710 A * 9/2000 White ......................... 707/200
6,263,339 B1 * 7/2001 Hirsch ........................ 707/102

FOREIGN PATENT DOCUMENTS

JP  7-168708  7/1995

* cited by examiner

Primary Examiner—Safet Metjahic
Assistant Examiner—Hassan Mahmoudi (57) ABSTRACT

An exchange servicing development support system automatically replaces definition contents and creates generation codes to new specifications, even if interfacing is changed, by reading servicing definition result files stored in accordance with old specifications. By providing a unit for re-constructing service tree structure data in a format in accordance with information about compatibility description in a menu describing file, the service tree structure data is automatically created. Since information about compatibility is allocated to the menu describing a file stored in the storage device, each unit in the data processing device is adapted to be used for a general purpose. The description of replacement of various patterns can be made by descriptions of information about compatibility in the menu describing file.

16 Claims, 8 Drawing Sheets

```
1  <inquiry>::answer(<menu-a>,<menu-b>,<menu-c>)
2  <menu-a>::0|1|2|3|4|5|6|7|8|9
3  <menu-b>::<item-x>|<item-y>
4  <item-x>::=XXX
5  <item-y>::=YYY
6  <menu-c>::<item-p>|<item-q>|<item-r>
7  <item-p>::=PPP
8  <item-q>::=QQQ
9  <item-r>::=RRR
```

FIG.4

```
1   <inquiry>::answer(<menu-a>,<menu-b>,<menu-c>,<menu-d>)
2   <menu-a>::0|1|2|3|4|5|6|7|8|9
3   <menu-b>::<item-x>|<item-y>
4   <item-x>::=XXX
5   <item-y>::=YYY
6   <menu-c>::<item-p>|<item-q>|<item-r>
7   <item-p>::=PPP
8   <item-q>::=QQQ
9   <item-r>::=RRR
10  <menu-d>::<item-h>|<item-i>
11  <item-h>::=HHH
12  <item-i>::=III
```

FIG.5

```
1  /*****Example of menu description*****/
2
3  /*struct-type skeleton description*/
4  %inquiry=struct{%menu-a %menu-b %menu-c}
5     format{"answer(%t,%t,%t)"%[0],%[1],%[2]}
6
7  /*field-type skeleton description*/
8  %menu-a=field
9     message   {"Input text"}
10    maxChars   16
11
12 /*oneOf-type skeleton description*/
13 %menu-b=oneOf{%item-x %item-y}
14    message   {"Set one"}
15    manuText"xxx;yyy"
16
17 /*oneOf-type skeleton description*/
18 %menu-c=oneOf{%item-p %item-q %item-r}
19    message   {"Set one"}
20    manuText"ppp;qqq;rrr"
21
22 /*quote-type skeleton description*/
23 %item-x="xxx"
24    format    {"XXX"}
25 %item-y="yyy"
26    format    {"YYY"}
27
28 /*quote-type skeleton description*/
29 %item-p="ppp"
30    format    {"PPP"}
31 %item-q="qqq"
32    format    {"QQQ"}
33 %item-r="rrr"
34    format    {"RRR"}
```

FIG.6

```
1  /*****Example of menu description*****/
2
3  /*struct-type skeleton description*/
4  %inquiry-new=struct{%menu-a %menu-b %menu-c %menu-d}
5      format{"answer(%t,%t,%t,%t)"%[0],%[1],%[2],%[3]}
6
7  /*struct-type skeleton description*/
8  %inquiry=struct{%menu-a %menu-b %menu-c}
9      format{"answer(%t,%t,%t)"%[0],%[1],%[2]}
10     newStyle(  /*Compatibility information description*/
11         varNewTree;
12         if(serviceFileVersion<2_0_5>{
13             var Subs;
14             treeUnmake(%$,&Subs);
15             NewTree=%inquiry-new(Subs[0], /*menu-a is set to the content
                                                 being presently selected*/
16                         Subs[1],         /*menu-b is set to the content
                                                 being presently selected*/
17                         Subs[2],         /*menu-c is set to the content
                                                 being presently selected*/
18                         %*menu-d(%item-h());/*menu-d is set to the state
                                                 where item-h has been selected*/
19         }
20         return NewTree;
21     )
22
23 /*field-type skeleton description*/
24 %menu-a=field
25     message    {"Input text"}
26     maxChars   16
27
28 /*oneOf-type skeleton description*/
29 %menu-b=oneOf{%item-x %item-y}
30     message    {"Set one"}
31     manuText"xxx;yyy"
32
33 /*oneOf-type skeleton description*/
34 %menu-c=oneOf{%item-p %item-q %item-r}
35     message    {"Set one"}
36     manuText"ppp;qqq;rrr"
37
38 /*oneOf-type skeleton description*/
39 %menu-d=oneOf{%item-h %item-i}
40     message    {"Set one"}
41     manuText"hhh;iii"
42
43 /*quote-type skeleton description*/
44 %item-x="xxx"
45     format     {"XXX"}
46 %item-y="yyy"
47     format     {"YYY"}
48
49 /*quote-type skeleton description*/
50 %item-p="ppp"
51     format     {"PPP"}
52 %item-q="qqq"
53     format     {"QQQ"}
54 %item-r="rrr"
55     format     {"RRR"}
56
57 /*quote-type skeleton description*/
58 %item-h="hhh"
59     format     {"HHH"}
60 %item-i="iii"
61     format     {"III"}
```

EXCHANGE SERVICING DEVELOPMENT SUPPORT SYSTEM WITH A FUNCTION OF AUTOMATIC REPLACEMENT OF EDITED CONTENTS

BACKGROUND OF THE INVENTION

1. Field of the Invention

The present invention relates to an exchange servicing development support system and more particularly to an exchange servicing development support system having a function of automatically replacing an edited content.

2. Description of the Related Art

A well known conventional exchange servicing development support system is disclosed in Japanese Laid-open Patent Application No. Hei7-168708. This disclosed exchange servicing development support system contains a scenario editor having an editor controlling section and an editor generating section. The editor controlling section is adapted to make an inquiry corresponding to a menu describing file in which a content of an inquiry to an exchange servicing software developer is defined, via an input/output device. The editor generating section is used to internally construct data in a tree structure format based on information selected and inputted by the exchange servicing software developer. This tree structure data can be stored, by the editor controlling section, in a service file as a consequence of editing.

Moreover, the tree structure data can be stored in a service code file using an output format defined in the menu describing file. This service code file can be converted to a program code containing a library call to implement the exchange servicing by using another unit, e.g., a program generator.

Thus, the exchange servicing development support system allows exchange servicing software developers to obtain the program code without any knowledge of a programming language, achieving easy development of exchange servicing software and improvement of its development efficiency.

However, the conventional technology has a shortcoming. That is, in the conventional system, since there is no regard for a change of an interface such as a library, if the interface such as libraries is changed, the menu describing file is so changed and, as a result, the content of the inquiry is changed accordingly, causing loss of compatibility with a service file already created in the exchange servicing development support system.

SUMMARY OF THE INVENTION

In view of the above, it is an object of the present invention to provide an exchange servicing development support system wherein definition contents can be automatically replaced and generation codes to new specifications can be created, even if interfacing is changed, only by reading servicing definition result files stored in accordance with old specifications.

According to a first aspect of the present invention, there is provided an exchange servicing development support system having a function of automatically replacing an edited content comprising:

an input/output device;
a data processing unit being operated under program control; and
a storage device;
wherein the data processing unit having:
 a menu description decoding program stored in the storage device for constructing menu data by reading a menu describing file in which a content of an inquiry about a menu is defined;
 a file decoding program for reading a servicing definition result file, stored in the storage device, in which designing specifications for exchange servicing are defined, while referencing to the menu data, when an exchange servicing file already edited is re-edited and its code is re-created, and for constructing service tree structure data, and for re-constructing the service tree structure data in a form in accordance with a description of information about compatibility when the description of information about compatibility exists at a corresponding part of the menu data;
 a service editing program for making an inquiry about a menu in a form in accordance with the menu data and for making the result reflected on the service tree structure data;
 a file encoding program for performing processing of storing the service tree structure data as the servicing definition result file when the edited result is stored in the storage device; and
 a code generating program for creating a generation coding file in a format designated by the menu data in accordance with the service tree structure data.

According to a second aspect of the present invention, there is provided an exchange servicing development support system having a function of automatically replacing an edited content for maintaining automatic compatibility with exchange servicing definition results edited in the exchange servicing development support system before designing specifications for exchange servicing are changed, comprising:

an input/output device;
a data processing unit being operated under program control; and
a storage device;
wherein the data processing unit described above having:
 a menu description decoding program stored in the storage device for constructing menu data by reading a menu describing file in which a content of an inquiry about a menu is defined;
 a file decoding program for reading a servicing definition result file, stored in the storage device, in which designing specifications for exchange servicing are defined, while referencing to the menu data, when exchange servicing file already edited is re-edited and its code is re-created, and for constructing service tree structure data, and for re-constructing the service tree structure data in a form in accordance with a description of information about compatibility when the description of information about compatibility exists at a corresponding part of the menu data;
 a service editing program for making an inquiry about a menu in a form in accordance with the menu data and for making the result reflected on the service tree structure data;
 a file encoding program for performing processing of storing the service tree structure data as the servicing definition result file when the edited result is stored in the storage device; and
 a code generating program for creating a generation coding file in a format designated by the menu data in accordance with the service tree structure data.

In the foregoing, a preferable mode is one wherein not only contents of inquiries about various parameters for implementing the exchange servicing but also contents required, when specifications are changed, for maintaining compatibility with contents edited before the change of specifications can be described in said menu describing file.

Also, a preferable mode is one wherein the file decoding unit reads the existing servicing definition result files when the existing servicing definition result files are edited, while referencing to the menu data, and if specifications are changed, expands the service tree structure data on the storage device while automatically replacing with contents stored in the menu data.

Also, a preferable mode is one wherein, even if an interface including libraries corresponded by the code generating unit is changed, by reading the existing servicing definition result file in a new environment of the menu describing file, automatic construction of the service tree structure data to new specifications and a final goal of creating the generating coding file to new specifications are made possible.

Furthermore, a preferable mode is one wherein the file decoding program retrieves information corresponding to one syntax tree of the service tree structure data from the servicing definition result file, creates a syntax tree constituting one factor of the service tree structure data using the retrieved information, makes a check on the menu data as to if the created syntax tree is a syntax tree that is able to become a parent, and if the present syntax tree is able to be a parent, creates a form of a tree structure by linkage with a child syntax tree, makes a check of the menu data as to if there is a compatibility information description of created syntax tree after the completion of linkage with the child syntax tree or if the present syntax tree does not become a parent, re-constructs a syntax tree in accordance with the compatibility information description existing in the menu data and, if the compatibility information description exists, makes a check on as to whether information about the servicing definition result file is terminated or not after the reconstruction of said syntax tree or if no compatibility information description exists, and if the information is not terminated, repeats processing following processing of retrieving information corresponding to one syntax tree of the service tree structure data from the servicing definition result file.

BRIEF DESCRIPTION OF THE DRAWINGS

The above and other objects, advantages and features of the present invention will be more apparent from the following description taken in conjunction with the accompanying drawings in which:

FIG. 6 is an example of the menu describing file corresponding to specifications established after changes of specifications, of the present invention;

DETAILED DESCRIPTION OF THE PREFERRED EMBODIMENTS

Best modes of carrying out the present invention will be described in further detail using various embodiments with reference to the accompanying drawings.

In an exchange servicing development support system of the present invention, even if design specifications for exchange servicing are changed, compatibility with exchange servicing definition results edited by the exchange servicing development support system before the change of the design specifications can be automatically maintained.

Figure 1:
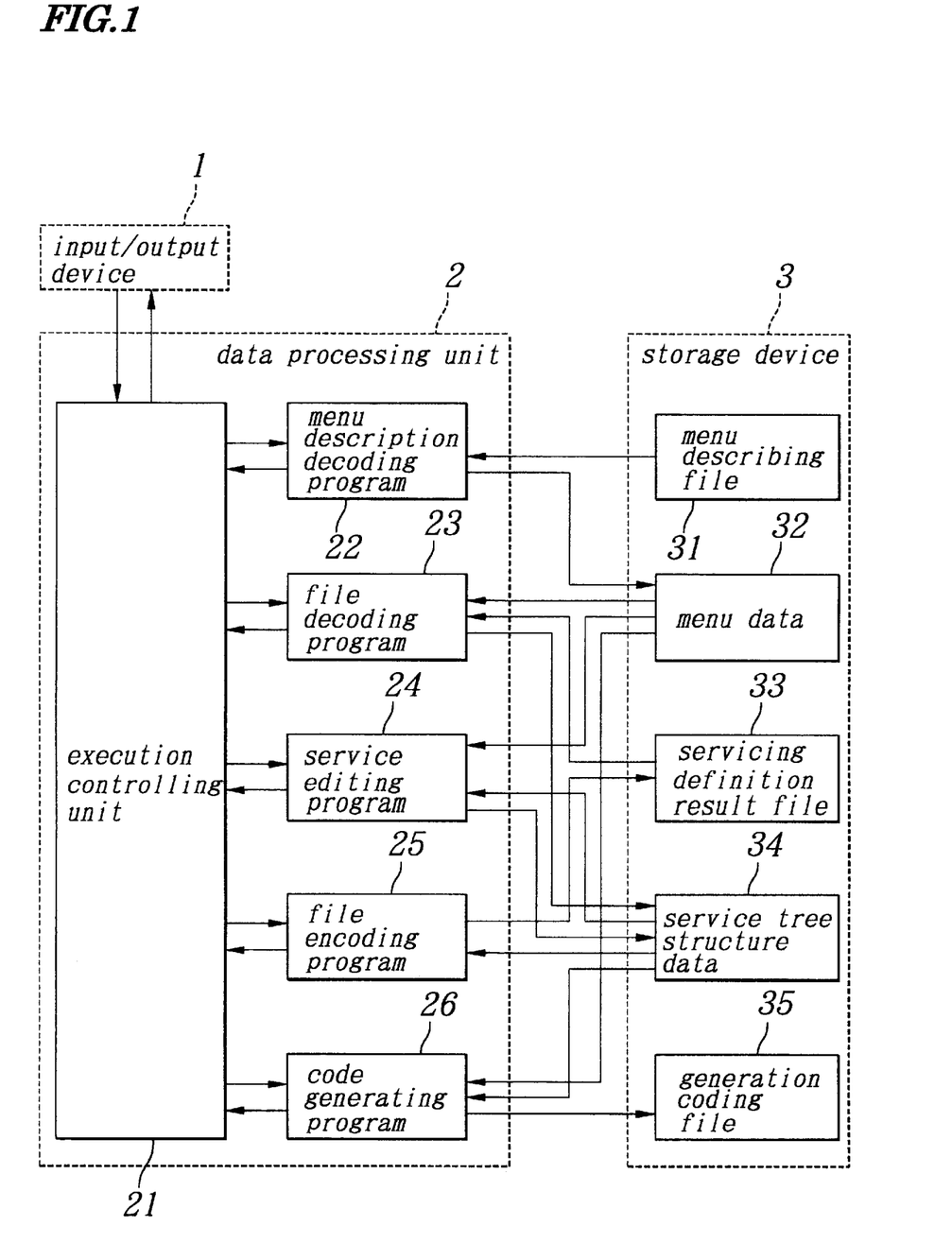
FIG. 1 is a block diagram showing configurations of an exchange servicing development support system having a function of automatically replacing an edited content of the present invention.

As shown in FIG. 1, the exchange servicing development support system having a function of automatically replacing an edited content of the present invention is comprised of an input/output device 1 including a key board, a mouse, a display or the like, a data processing unit 2 adapted to operate under programming control and a storage device 3.

The data processing unit 2 has an execution controlling unit 21, a menu description decoding program 22, a file decoding program 23, a service editing program 24, a file encoding program 25 and a code generating program 26. The storage device 3 contains a menu describing file 31, menu data 32, a servicing definition result file 33, service tree structure data 34 and a generation coding file 35.

Referring to FIG. 1, not only contents of inquiries about various parameters for implementing the exchange servicing function but also contents required, when specifications are changed, for maintaining compatibility with contents edited before the change of specifications can be described in the menu describing file 31, in which design specifications for exchange servicing are defined. The menu describing file 31 is a text file in which a content of an inquiry about a menu is defined and any description in the menu describing file 31 is not made by the exchange servicing development support system. The menu describing file 31 is expanded as menu data 32 on the storage device 3 by the menu description decoding unit 22. When the existing servicing definition result file 33 is edited, the file decoding program 23 is adapted to read the existing servicing definition result file 33, while referencing to the menu data 32, and if specifications are changed, to expand the service tree structure data 34 on the storage device 3 while automatically replacing with contents stored in the menu data 32.

Thus, even if the interface such as libraries corresponded by the code generating program 26 is changed, by reading the existing servicing definition result file 33 in a new environment of the menu describing file 31, automatic construction of the service tree structure data 34 to new specifications and a final goal of creating the generating coding file 35 to new specifications are made possible.

Next, operations of each unit are described below. The execution controlling unit 21 controls interfacing of the input/output device 1 or the interfacing of other unit positioned at the data processing unit 2. The menu description decoding program 22 reads the menu describing file 31 and constructs menu data 32. The menu describing file 31 contains the description (hereafter called "compatibility information description and notation") required to maintain compatibility with contents previously edited and a part corresponding to the compatibility information description is constructed in the menu data 32.

The file decoding program 23 is driven by the execution controlling unit 21 to re-edit the exchange service which has been already edited by the exchange servicing development support system and to re-generate a code which has been already coded. The file decoding program 23 is adapted to read the servicing definition result file 33 obtained by previous editing while referencing to the menu data 32, to construct the service tree structure 34 and, if there is the compatibility information description at a corresponding part of the menu data 32, and to re-construct the service tree structure 34 based on the compatibility information description The service editing program 24 is adapted to make an inquiry about a menu in accordance with menu data 32 and to make its results reflected in the service tree structure data 34. The file encoding program 25, when storing the edited result into the storage device 3, is adapted to perform processing of storing the service tree structure 34 as the servicing definition result file 33. The code generating program 26 generates the generating coding file 35 in a format designated by the menu data 32 in accordance with the service tree structure data 34.

Figure 2:
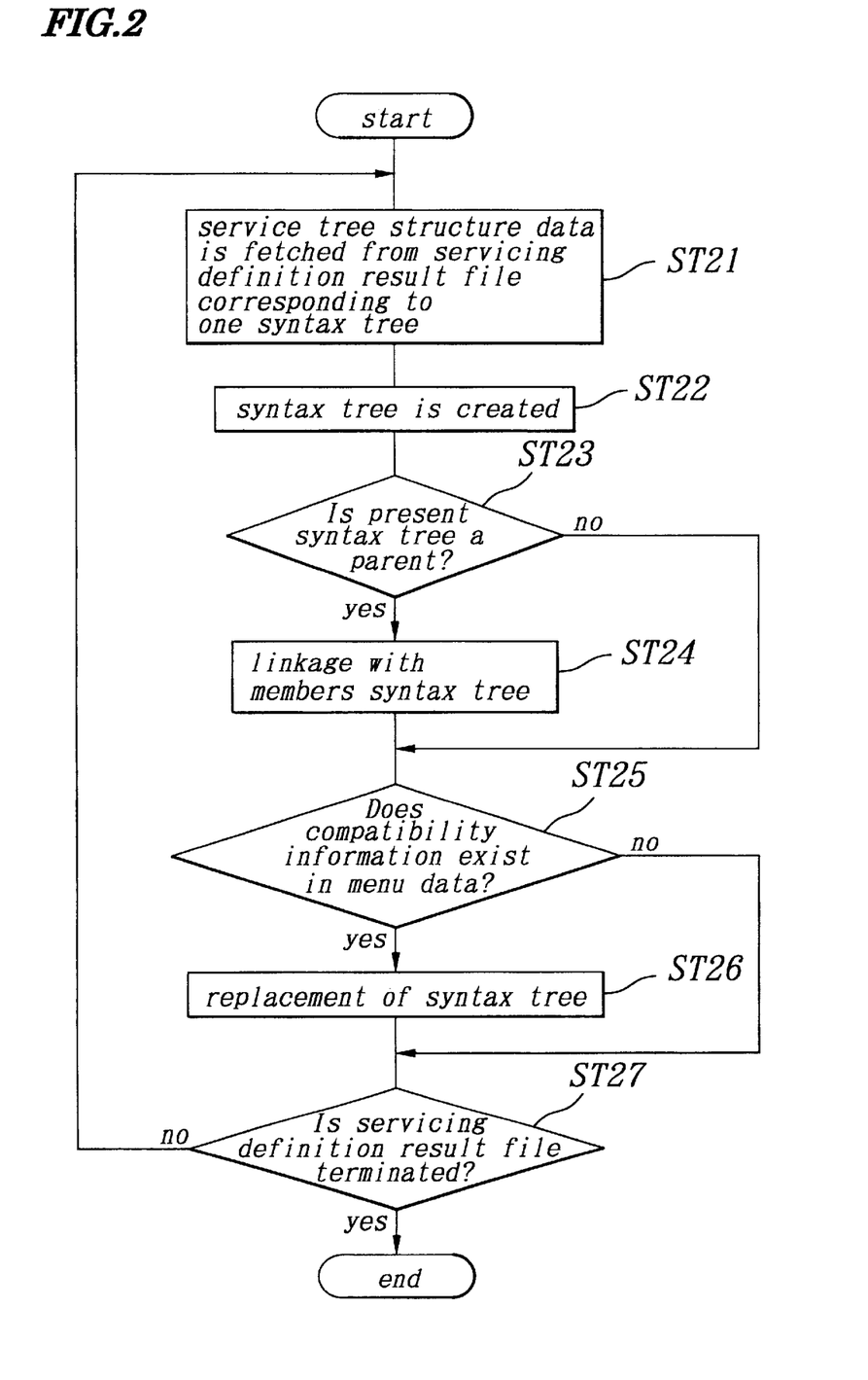
FIG. 2 is a flowchart showing operations of the above exchange servicing development support system of the present invention.
Figure 3:
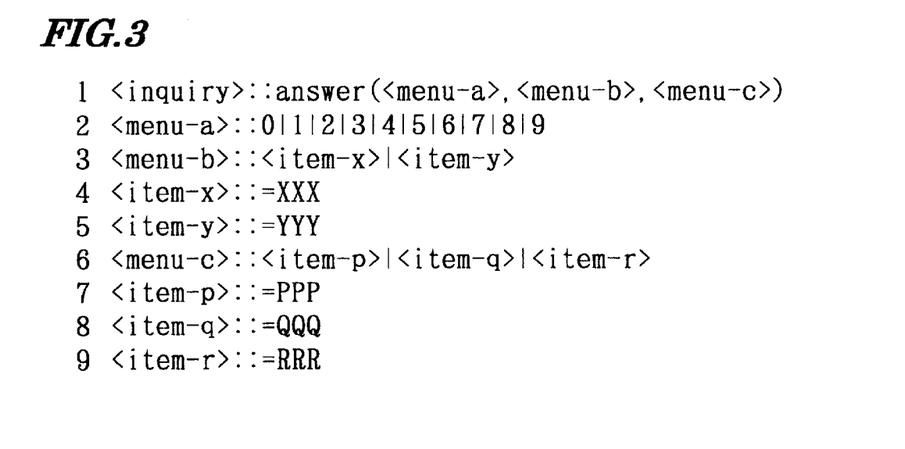
FIG. 3 shows an example of a syntax of a generation code file described in BNF (Backus-Naur Form) of the present invention.
Figure 4:
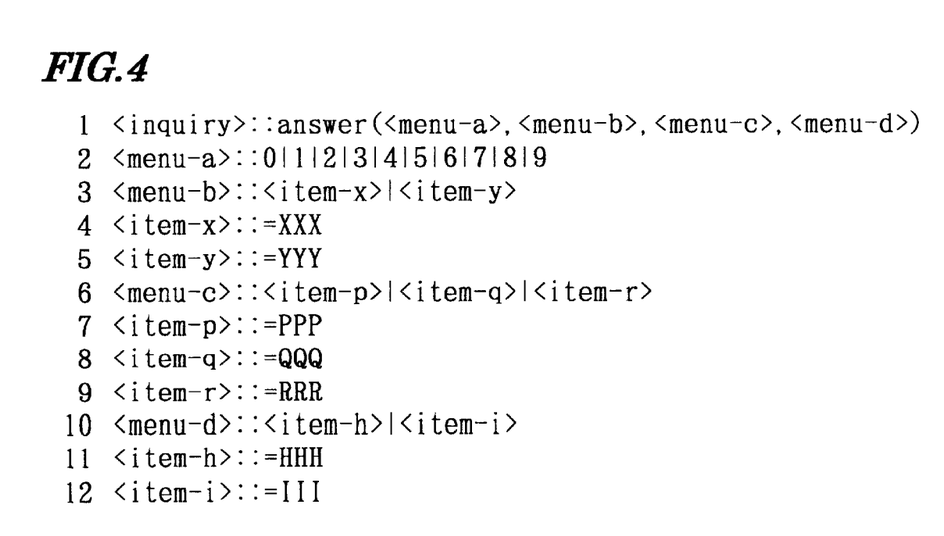
FIG. 4 shows an example of a syntax of the generation code file created after changes of specifications, described in the BNF, of the present invention.
Figure 5:
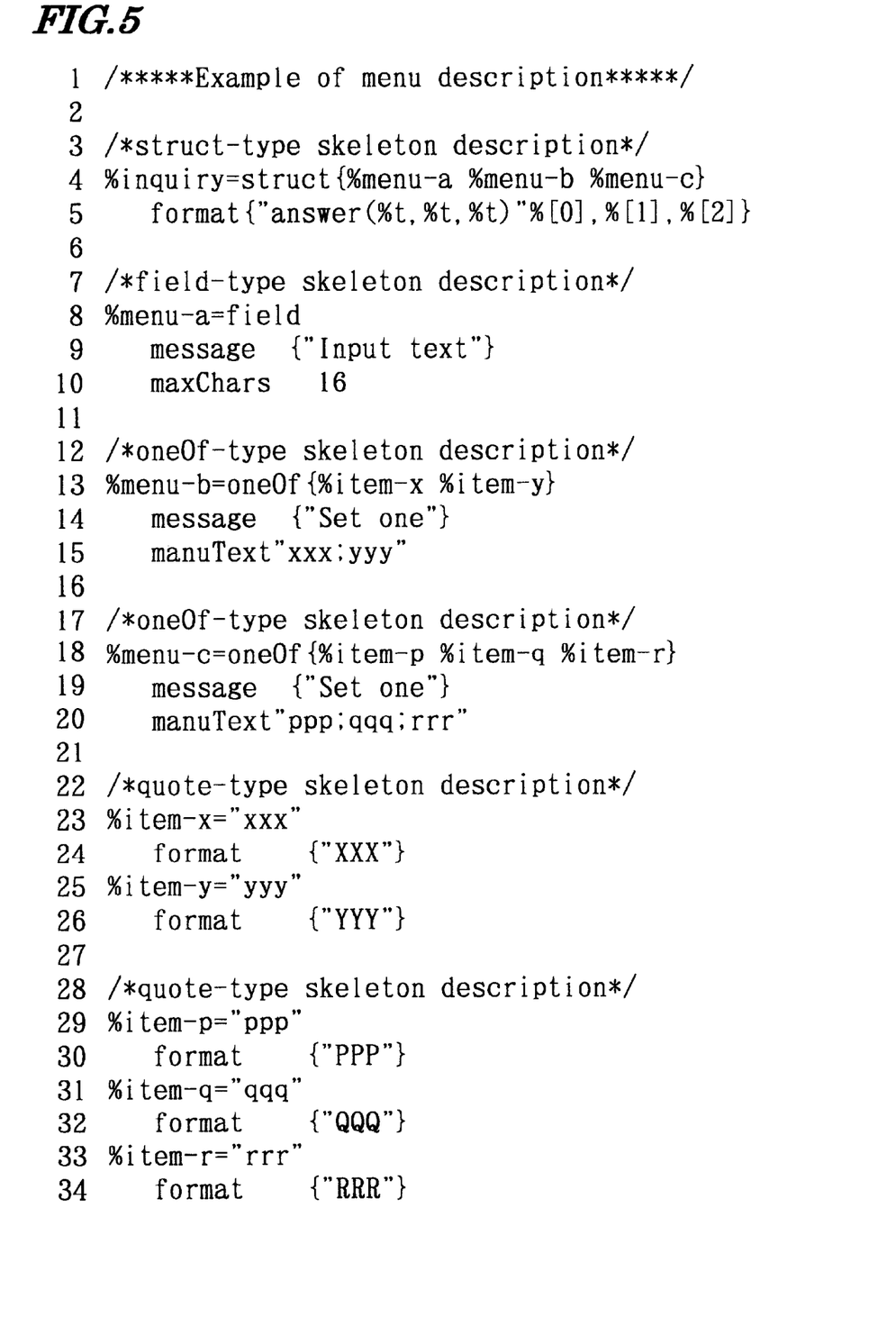
FIG. 5 shows an example of a menu describing file of the present invention.
Figure 7:
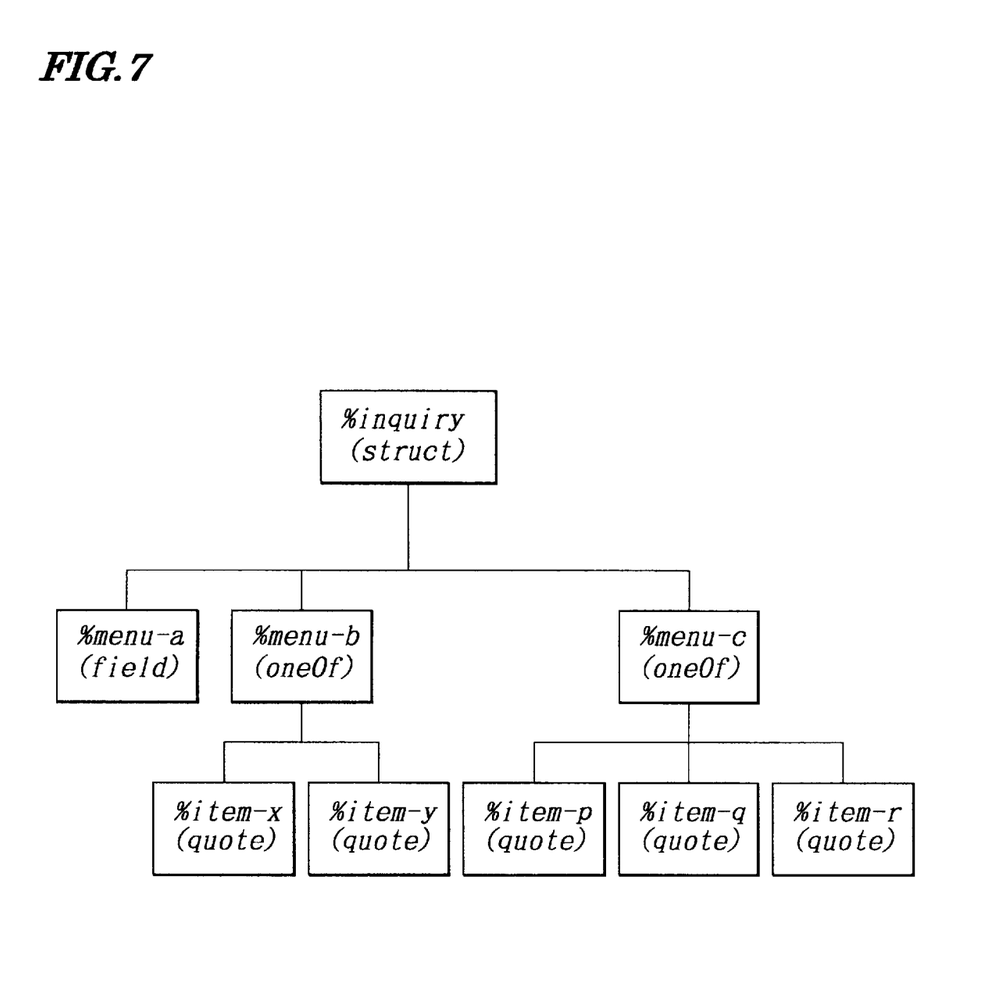
FIG. 7 shows a tree structure of an example of menu data of the present invention.
Figure 8:
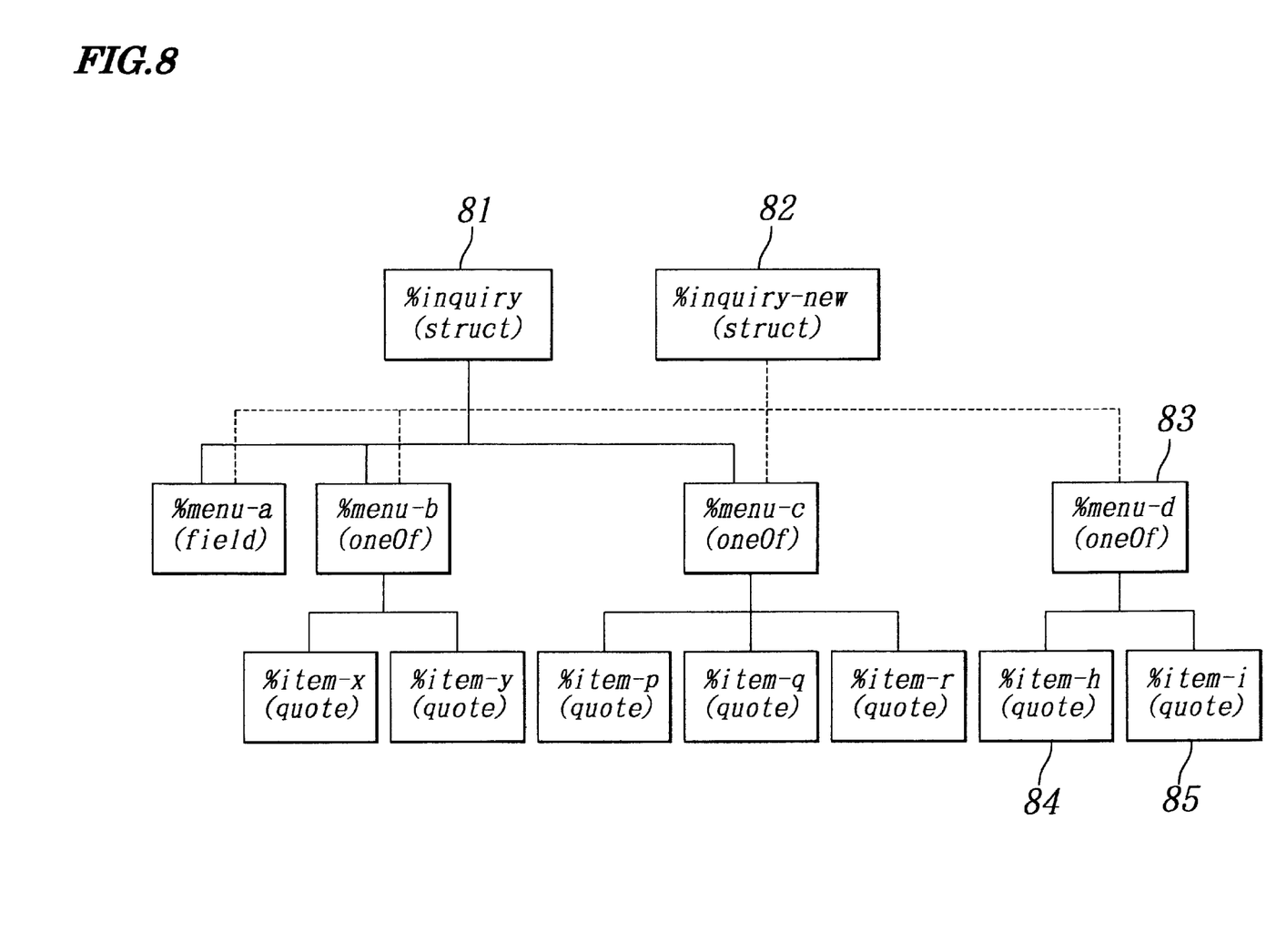
FIG. 8 shows a tree structure of an example of the menu data created after changes of specifications of the present invention.
Figure 9:
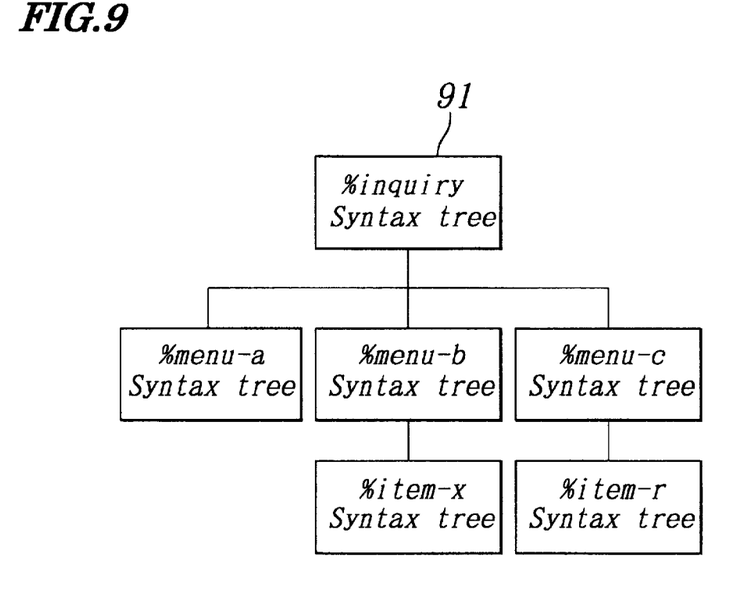
FIG. 9 shows a tree structure of an example of a service tree structure established after changes of specifications, of the present invention.
Figure 10:
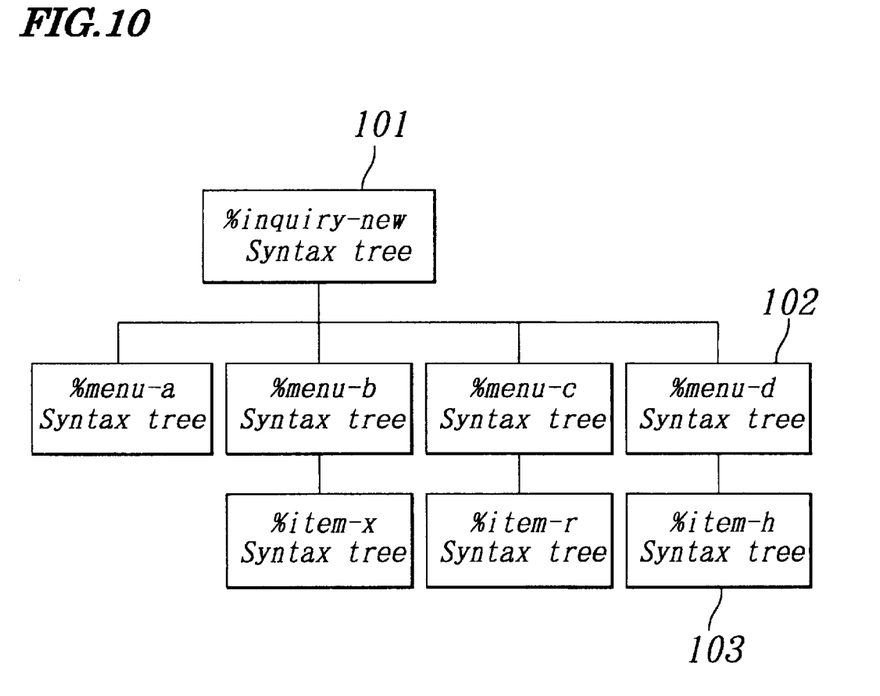
FIG. 10 shows a tree structure of an example of the menu data created after change of specifications of the present invention.

The whole operations of the exchange servicing development support system in accordance with this embodiment are hereinafter described in detail by referring to FIGS. 1 to 10. FIG. 1 is a block diagram showing configurations of the exchange servicing development support system having a function of automatically replacing an edited content of the present invention. FIG. 2 is a flowchart showing operations of the exchange servicing development support system. FIG. 3 shows an example of a syntax of a generation code file described in BNF (Backus-Naur Form). FIG. 4 shows an example of a syntax of the generation code file created after changes of specifications, described in the BNF. FIG. 5 shows an example of a menu describing file. FIG. 6 is an example of the menu describing file corresponding to specifications established after changes of specifications. FIG. 7 shows a tree structure of an example of menu data. FIG. 8 shows a tree structure of an example of the menu data created after changes of specifications. FIG. 9 shows a tree structure of an example of a service tree structure established after changes of specifications. FIG. 10 shows a tree structure of an example of the menu data created after changes of specifications.

The process flows including newly editing the exchange servicing file, creating the generating coding file (Reference no. 35 in FIG. 1) and re-creating the generation coding file (Reference no. 35 in FIG. 1) created after changes of the generation code specifications are described.

Referring to FIG. 1, the execution controlling unit 21, when receiving a driving command from the input/output device 1, is adapted to instruct the menu description decoding program 22 to read the menu describing file 31. Contents of an inquiry about a menu used to derive the generation coding file 35 and an output format are described in the menu describing file 31. In the example used for the description, the generation code is composed of a syntax as described in BNF (Backus-Naur Form). Referring to FIG. 3, for example, the generation code is composed of three factors, a first factor being a selection of numerals from 0 to 9 (on the 2nd line in FIG. 3), a second factor being a selection from XXX or YYY (on the 3rd line in FIG. 3) and a third factor being a selection from PPP or QQQ (on the 6th line in FIG. 3) and the generation code is given, for example, as "answer" (3, XXX, RRR). Examples of the menu describing file corresponding to these factors are shown in FIG. 5 in which contents of the inquiry about the menu and output format to derive the syntax in BNF are defined.

Then, the menu description decoding program 22 constructs the menu data 32 in the form of the tree structure. FIG. 7 is an example of the tree structure for the menu data, in which the tree structure corresponding to contents of the menu describing file 31 shown in FIG. 5. At this point, preparation for editing the exchange servicing is complete and control is returned to execution controlling unit 21 and the system is placed in a waiting state for a command from the input/output device 1.

The execution controlling unit 21, when receiving a command to create a new exchange servicing software from the input/output device 1, is adapted to drive the service editing program 24. The service editing program 24, while referencing to the menu data 32, makes an inquiry about the menu via the execution controlling unit 21 and the input/output device 1, and constructs the service tree structure data 34 to respond to consequences of the menu inputting and the menu selection.

FIG. 9, which shows a tree structure of an example of a service tree structure established after changes of specifications, indicates that tree structures are constructed as consequences of inputting of a numeral 3 in response to the first inquiry, selection of XXX in response to the second inquiry and selection of RRR in response to the third inquiry. Then, control is returned to the execution controlling unit 21 and the system is placed in a waiting state for a command from the input/output device 1. The input/output device 1, when receiving a command to create a code from the execution controlling unit 21, is adapted to drive the code generating program 26.

The code generating program 26, while tracing the service tree structure 34 already constructed, is adapted to create the generation coding file 35 being a final goal in accordance with an output format in the menu data 32. As the consequence of the previous menu selection, the "answer" (3, XXX, RRR) is outputted. Control is again returned to the execution controlling unit 21 and the execution controlling unit 21, when receiving a command to store editing results from the input/output device 1, drives the file encoding program 25. The file encoding program 25 stores the result of servicing definition in a format in accordance with tree structure of the service tree structure data 34.

Next, the flow of processes including re-generation of the generation coding file 35 created after the change of specifications of the generation code is described below. The flow from a process in which the menu describing file 31 is read in the menu description decoding program 22 to a process in which the menu data 32 is constructed is the same as those described above. In this example, the generation code to be an object is changed to a syntax in BNF shown in FIG. 4. As shown in FIG. 4, a fourth factor is added which is a selection of HHH or IIII (on the 10th line in FIG. 4.

The example of the menu describing file corresponding to the above is shown in FIG. 6. In the example of the menu description as shown in FIG. 6, unlike the previous menu describing file, factors on the 4th to 5th line, description of information about compatibility with the previous format (format containing three factors) on the 8th to 21st lines, contents of inquiries about additional factors and descriptions of generation code outputting formats on the 39th to 41st lines and 58th to 61st lines are added. The menu data 32 corresponding to the above menu description is shown in FIG. 8. Referring to FIG. 8, data represented by reference numbers 82 to 85 are added which are not contained in the previous menu data shown in FIG. 7. Moreover, data represented by reference number 81 contains corresponding to the compatibility information description on the 10th to 21st lines in the menu describing file in FIG. 6. Then, the execution controlling unit 21 is adapted to receive a command for reading the servicing definition result file 33 from the input/output device 1. The execution controlling unit 21 is adapted to instruct the file decoding program 23 to read the servicing definition result file 33 stored in a format in accordance with the old tree structure.

FIG. 2 is a flowchart showing operations of the file decoding program 23 of the exchange servicing development of the present invention. First, the service tree structure data 34 is retrieved from the servicing definition result file 33 corresponding to one syntax tree of data (ST21 in FIG. 2). Then, the syntax tree which constitutes one factor of the service tree structure data 34 from retrieved information is created (ST22). A checking on the menu data 32 as to whether the created syntax tree can be a parent or not is investigated and the operation moves to ST24 if it is true and to ST25 if false (ST23). If the present syntax tree can become the parent, the tree structure is formed by the linkage with a child syntax tree (ST24). A checking on the menu data 32 as to whether the compatibility information description of the created syntax tree exists or not is investigated and the operation moves to ST26 if it is true and to ST27 if false (ST25).

Next, during the replacement of the syntax tree, syntax tree is re-constructed in accordance with the compatibility information description stored in the menu data 32 (ST26). Lastly, a checking on the menu data 32 as to whether the information of the servicing definition result file 33 is terminated or not is made and the operation moves to ST21 if it is terminated (ST27).

If the servicing definition result file 33 stored in a format in accordance with the old tree structure is read by the file decoding program 23, though the service tree structure data having the same tree structure as that of the old format is once constructed as shown in FIG. 9, because there is the compatibility information description in the menu data (81 in FIG. 8) corresponding to a syntax tree 91 (in FIG. 9), the tree structure is re-constructed and, as a result, the service tree structure data is constructed shown in FIG. 10. Unlike the tree structure data of the old format as shown in FIG. 9, a new syntax tree 101 as a parent syntax tree having four factors is created and the parent syntax tree of the old format is deleted. Moreover, new syntax trees 102 to 103 are additionally created. Though the processes of generating the code and of the storage into the servicing definition result file, contents of created codes and servicing definition result file are replaced automatically with those having specifications. For example, the content of the generation coding file 35 is created in the coding form of "answer" (3,XXX,RRR, HHH) since the service tree structure data as shown in FIG. 9 is changed to that as shown in FIG. 10.

In the embodiment described above, the selection information of HHH or III is added to the fourth factor of the generation code. The present invention is not limited to such changes of patterns. However, such an automatic replacement as the fourth factor of the generation code is changed to numerals 0 to 9 and the default: 0 is selected can be easily made only if compatibility information descriptions are provided in the menu describing file as shown in FIG. 6.

As described above, according to the present invention, since the service tree structure data is automatically re-constructed with a unit to re-construct the service tree structure data in a form in accordance with the information about compatibility description of the menu describing file provided, even if the interface such as libraries corresponding to the generation code is changed in the present exchange servicing development support system, only by reading the servicing definition result file stored in accordance with old specifications, a content of definition is automatically replaced and the generation code to new specifications can be created and, as a result, automatic tracing to the change in the interface such as libraries is made possible. For example, by describing on an added part of the interface within the compatibility information description so that a default parameter is designated, the compatibility can be achieved.

Furthermore, according to the present invention, since information about compatibility is allocated to the menu describing file stored in the storage device, each unit in the data processing device is adapted to be used for a general-purpose application. Since the description of replacement of various patterns can be made by descriptions of information about compatibility in the menu describing file, the compatibility can be comparatively easily achieved. The more changes in interfaces such as libraries exist, the greater effects can be obtained.

It is thus apparent that the present invention is not limited to the above embodiments but may be changed and modified without departing from the scope and spirit of the invention.

Finally, the present application claims the priority based on Japanese Patent Application No. Hei10-370468 filed on Dec. 25, 1998, which is herein incorporated by reference.

What is claimed is:

1. An exchange servicing development support system having a function of automatically replacing an edited content comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when an exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about said menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein not only contents of inquiries about various parameters for implementing said exchange servicing but also contents required, when specifications are changed, for maintaining compatibility with contents edited before the change of specifications can be described in said menu describing file.

2. An exchange servicing development support system having a function of automatically replacing an edited content comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when an exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about a menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein said file decoding means reads said existing servicing definition result files when said existing servicing definition result files are edited, while referencing to the menu data, and if specifications are changed, expands said service tree structure data in said storage device while automatically replacing contents edited before the change of specifications with contents stored in said menu data.

3. An exchange servicing development support system having a function of automatically replacing an edited content comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when an exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about a menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein, even if an interface including libraries corresponded by said code generating means is changed, by reading said existing servicing definition result file in a new environment of said menu describing file, automatic construction of said service tree structure data to new specifications and a final goal of creating the generating coding file to new specifications are made possible.

4. An exchange servicing development support system having a function of automatically replacing an edited content comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when an exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about a menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein said file decoding means retrieves information corresponding to a first syntax tree of said service tree structure data from said servicing definition result file, creates said first syntax tree constituting one component of said service tree structure data using the retrieved information, makes a check on said menu data as to, if the created first syntax tree is a syntax tree that is able to become a parent, and if the present syntax tree is able to be a parent, creates a form of a tree structure by linkage with a child syntax tree, makes a check of said menu data as to, if there is a compatibility information description of the created syntax tree after the completion of linkage with said child syntax tree or if the present syntax tree does not become a parent, re-constructs said first syntax tree in accordance with said compatibility information description existing in said menu data and, if said compatibility information description exists, makes a check on whether information about said servicing definition result file is terminated or not after the reconstruction of said syntax tree, or if no compatibility information description exists, and if said information is not terminated, repeats processing following processing of retrieving information corresponding to a second syntax tree of said service tree structure data from said servicing definition result file.

5. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about a menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein not only contents of inquiries about various parameters for implementing said exchange servicing but also contents required, when specifications are changed, for maintaining compatibility with contents edited before the change of specifications can be described in said menu describing file.

6. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about a menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein said file decoding means reads said existing servicing definition result files when said existing servicing definition result files are edited, while referencing to the menu data, and if specifications are changed, expands said service tree structure data in said storage device while automatically replacing contents edited before the change of specifications with contents stored in said menu data.

7. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about a menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein, even if an interface including libraries corresponded by said code generating means is changed, by reading said existing servicing definition result file in a new environment of said menu describing file, automatic construction of said service tree structure data to new specifications and a final goal of creating the generating coding file to new specifications are made possible.

8. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

wherein said data processing unit having:

menu description decoding means stored in said storage device for constructing menu data by reading a menu describing file in which a content of an inquiry about a menu is defined;

file decoding means for reading a servicing definition result file, stored in said storage device, in which designing specifications for exchange servicing are defined, while referencing to said menu data, when exchange servicing file already edited is re-edited and its code is re-created, and for constructing service tree structure data, and for re-constructing said service tree structure data in a form in accordance with a description of information about compatibility when said description of information about compatibility exists at a corresponding part of said menu data;

service editing means for making an inquiry about a menu in a form in accordance with said menu data and for making the result reflected on said service tree structure data;

file encoding means for performing processing of storing said service tree structure data as said servicing definition result file when the edited result is stored in said storage device; and code generating means for creating a generation coding file in a format designated by said menu data in accordance with said service tree structure data;

wherein said file decoding means retrieves information corresponding to a first syntax tree of said service tree structure data from said servicing definition result file, creates said first syntax tree constituting one component of said service tree structure data using the retrieved information, makes a check on said menu data as to, if the created first syntax tree is a syntax tree that is able to become a parent, and if the present syntax tree is able to be a parent, creates a form of a tree structure by linkage with a child syntax tree, makes a check of said menu data as to, if there is a compatibility information description of the created syntax tree after the completion of linkage with said child syntax tree or if the present syntax tree does not become a parent, re-constructs said first syntax tree in accordance with said compatibility information description existing in said menu data and, if said compatibility information description exists, makes a check on whether information about said servicing definition result file is terminated or not after the reconstruction of said syntax tree, or if no compatibility information description exists, and if said information is not terminated, repeats processing following processing of retrieving information corresponding to a second syntax tree of said service tree structure data from said servicing definition result file.

9. An exchange servicing development support system having a function of automatically replacing an edited content comprising:

an input/output device;

a data processing unit being operated under program control; and a storage device;

said data processing unit, operating under program control to perform the functions of:

constructing menu data by reading a menu describing file in which a content of an inquiry about a menu is defined;

reading a servicing definition result file, stored in said storage device, in which designing specifications for exchange servicing are defined, while referencing to said menu data, when an exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data; and describing, in said menu describing file, (1) contents of inquiries about various parameters for implementing said exchange servicing and (2) contents required, when specifications are changed, for maintaining compatibility with contents edited before the change of specifications.

10. An exchange servicing development support system having a function of automatically replacing an edited content comprising:

an input/output device;

a data processing unit being operated under program control; and a storage device;

said data processing unit, operating under program control to perform the functions of:

constructing menu data by reading a menu describing file in which a content of an inquiry about a menu is defined;

reading a servicing definition result file, stored in said storage device, in which designing specifications for exchange servicing are defined, while referencing to said menu data, when an exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data; and wherein said file decoding means reads said existing servicing definition result files when said existing servicing definition result files are edited, while referencing to the menu data, and if specifications are changed, expands said service tree structure data in said storage device while automatically replacing contents edited before the change of specifications with contents stored in said menu data.

11. An exchange servicing development support system having a function of automatically replacing an edited content comprising:

an input/output device;

a data processing unit being operated under program control; and a storage device;

said data processing unit, operating under program control to perform the functions of:

constructing menu data by reading a menu describing file in which a content of an inquiry about a menu is defined;

reading a servicing definition result file, stored in said storage device, in which designing specifications for exchange servicing are defined, while referencing to said menu data, when an exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data; and wherein, even if an interface including libraries corresponded by said code generating means is changed, by reading said existing servicing definition result file in a new environment of said menu describing file, automatic construction of said service tree structure data to new specifications and a final goal of creating the generating coding file to new specifications are made possible.

12. An exchange servicing development support system having a function of automatically replacing an edited content comprising:

an input/output device;

a data processing unit being operated under program control; and a storage device;

said data processing unit, operating under program control to perform the functions of:

constructing menu data by reading a menu describing file in which a content of an inquiry about a menu is defined;

reading a servicing definition result file, stored in said storage device, in which designing specifications for exchange servicing are defined, while referencing to said menu data, when an exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data; and wherein said file decoding means retrieves information corresponding to a first syntax tree of said service tree structure data from said servicing definition result file, creates said first syntax tree constituting one component of said service tree structure data using the retrieved information, makes a check on said menu data as to, if the created first syntax tree is a syntax tree that is able to become a parent, and if the present syntax tree is able to be a parent, creates a form of a tree structure by linkage with a child syntax tree, makes a check of said menu data as to, if there is a compatibility information description of the created syntax tree after the completion of linkage with said child syntax tree or if the present syntax tree does not become a parent, re-constructs said first syntax tree in accordance with said compatibility information description existing in said menu data and, if said compatibility information description exists, makes a check on whether information about said servicing definition result file is terminated or not after the reconstruction of said syntax tree, or if no compatibility information description exists, and if said information is not terminated, repeats processing following processing of retrieving information corresponding to a second syntax tree of said service tree structure data from said servicing definition result file.

13. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

said data processing unit operating under program control for:

constructing menu data by reading a menu describing file in which a content of an inquiry about a menu is defined;

reading a servicing definition result file, stored in said storage device, in which designing specifications for exchange servicing are defined, while referencing to said menu data, when exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data;

wherein (1) contents of inquiries about various parameters for implementing said exchange servicing and (2) contents required, when specifications are changed, for maintaining compatibility with contents edited before the change of specifications are described in said menu describing file.

14. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

said data processing unit operating under program control for:

constructing menu data by reading a menu describing file in which a content of an inquiry about a menu is defined;

reading a servicing definition result file, stored in said storage device, in which designing specifications for exchange servicing are defined, while referencing to said menu data, when exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data; and wherein said file decoding means reads said existing servicing definition result files when said existing servicing definition result files are edited, while referencing to the menu data, and if specifications are changed, expands said service tree structure data in said storage device while automatically replacing contents edited before the change of specifications with contents stored in said menu data.

15. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

said data processing unit operating under program control for:

constructing menu data by reading a menu describing file in which a content of an inquiry about a menu is defined;

reading a servicing definition result file, stored in said storage device, in which designing specifications for exchange servicing are defined, while referencing to said menu data, when exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data; and wherein, even if an interface including libraries corresponded by said code generating means is changed, by reading said existing servicing definition result file in a new environment of said menu describing file, automatic construction of said service tree structure data to new specifications and a final goal of creating the generating coding file to new specifications are made possible.

16. An exchange servicing development support system having a function of automatically replacing an edited content for maintaining automatic compatibility with exchange servicing definition results edited in said exchange servicing development support system before designing specifications for exchange servicing are changed, comprising:

an input/output device;

a data processing unit being operated under program control; and a storage device;

said data processing unit operating under program control for:

constructing menu data by reading a menu describing file in which a content of an inquiry about a menu is defined;

reading a servicing definition result file, stored in said storage device, in which designing specifications for exchange servicing are defined, while referencing to said menu data, when exchange servicing file already edited is re-edited and its code is re-created, and constructing service tree structure data, and re-constructing said service tree structure data in a form in accordance with a description of information about compatibility when said description of information about compatibility exists at a corresponding part of said menu data;

making an inquiry about a menu in a form in accordance with said menu data and for making the result reflected on said service tree structure data;

performing processing of storing said service tree structure data as said servicing definition result file when the edited result is stored in said storage device; and creating a generation coding file in a format designated by said menu data in accordance with said service tree structure data;

wherein said file decoding means retrieves information corresponding to a first syntax tree of said service tree structure data from said servicing definition result file, creates said first syntax tree constituting one component of said service tree structure data using the retrieved information, makes a check on said menu data as to, if the created first syntax tree is a syntax tree that is able to become a parent, and if the present syntax tree is able to be a parent, creates a form of a, tree structure by linkage with a child syntax tree, makes a check of said menu data as to, if there is a compatibility information description of the created syntax tree after the completion of linkage with said child syntax tree or if the present syntax tree does not become a parent, re-constructs said first syntax tree in accordance with said compatibility information description existing in said menu data and, if said compatibility information description exists, makes a check on whether information about said servicing definition result file is terminated or not after the reconstruction of said syntax tree, or if no compatibility information description exists, and if said information is not terminated, repeats processing following processing of retrieving information corresponding to a second syntax tree of said service tree structure data from said servicing definition result file.

* * * * *